US008458246B2

(12) United States Patent
Guney et al.

(10) Patent No.: US 8,458,246 B2
(45) Date of Patent: Jun. 4, 2013

(54) WEB APPLICATION FRAMEWORK METHOD ENABLING THE CREATION OF APPLICATIONS THAT PROVIDE AN INTERFACE WITH CLIENTS THAT IS INDEPENDENT OF SCRIPTING CAPABILITY

(75) Inventors: Ergin Guney, Redwood City, CA (US); Nedim Fresko, Redwood City, CA (US)

(73) Assignee: Research In Motion Limited, Waterloo (CA)

( * ) Notice: Subject to any disclaimer, the term of this patent is extended or adjusted under 35 U.S.C. 154(b) by 126 days.

(21) Appl. No.: 12/493,377

(22) Filed: Jun. 29, 2009

(65) Prior Publication Data
US 2010/0100585 A1 Apr. 22, 2010

Related U.S. Application Data

(60) Provisional application No. 61/106,594, filed on Oct. 19, 2008.

(51) Int. Cl.
*G06F 15/16* (2006.01)
*G06F 9/44* (2006.01)
*G06F 17/00* (2006.01)

(52) U.S. Cl.
USPC ............ 709/203; 709/217; 707/695; 717/171

(58) Field of Classification Search
USPC .... 709/203, 217; 707/694, 695; 717/168–173
See application file for complete search history.

(56) References Cited

U.S. PATENT DOCUMENTS

| | | | |
|---|---|---|---|
| 6,035,298 A | 3/2000 | McKearney | |
| 6,266,681 B1 | 7/2001 | Guthrie | |
| 6,965,947 B1 | 11/2005 | Hild et al. | |
| 7,155,681 B2 | 12/2006 | Mansour et al. | |
| 7,222,138 B2 | 5/2007 | Fomenko | |
| 7,391,784 B1* | 6/2008 | Renkel | 370/401 |
| 7,769,895 B1 | 8/2010 | Williams et al. | |
| 2002/0103858 A1 | 8/2002 | Bracewell et al. | |
| 2002/0103934 A1 | 8/2002 | Fishman et al. | |
| 2002/0120684 A1 | 8/2002 | Christfort et al. | |
| 2003/0005019 A1 | 1/2003 | Pabla et al. | |
| 2003/0110234 A1 | 6/2003 | Egli et al. | |
| 2003/0200283 A1 | 10/2003 | Suryanarayana et al. | |
| 2004/0027375 A1 | 2/2004 | Ellis et al. | |
| 2004/0039801 A9 | 2/2004 | Srinivasan et al. | |
| 2004/0128358 A1 | 7/2004 | Apfel et al. | |
| 2004/0143591 A1* | 7/2004 | Onyeabor | 707/102 |

(Continued)

FOREIGN PATENT DOCUMENTS

| | | |
|---|---|---|
| CA | 2667378 A1 | 6/2008 |
| WO | 02/50719 A2 | 6/2002 |
| WO | 2008115646 A1 | 9/2008 |

OTHER PUBLICATIONS

Wikipedia definition for ActiveX Data Objects, searched on Jun. 18, 2011.*

(Continued)

*Primary Examiner* — Jeong S Park
(74) *Attorney, Agent, or Firm* — Novak Druce Connolly Bove + Quigg LLP

(57) ABSTRACT

An improved web application framework methodology enables the creation of web applications which can respond to client requests in a fashion that results in rendering which appears on the client to be independent of scripting capability.

17 Claims, 5 Drawing Sheets

U.S. PATENT DOCUMENTS

| | | | |
|---|---|---|---|
| 2004/0148375 A1 | 7/2004 | Levett et al. | |
| 2005/0120091 A1 | 6/2005 | Casais et al. | |
| 2005/0193380 A1 | 9/2005 | Vitanov et al. | |
| 2007/0143672 A1* | 6/2007 | Lipton et al. | 715/530 |
| 2008/0071883 A1* | 3/2008 | Alterman | 709/217 |
| 2008/0139191 A1 | 6/2008 | Melnyk et al. | |
| 2008/0189360 A1 | 8/2008 | Kiley et al. | |
| 2008/0195712 A1* | 8/2008 | Lin et al. | 709/206 |
| 2008/0207182 A1 | 8/2008 | Maharajh et al. | |
| 2008/0244464 A1* | 10/2008 | Slattery | 715/856 |
| 2009/0276764 A1 | 11/2009 | Ghorbani et al. | |
| 2009/0327468 A1* | 12/2009 | Hirsch et al. | 709/223 |

OTHER PUBLICATIONS

Author Unknown, "I'm looking for a regular expression to remove a given (x)HTML tag from a string", stackoverflow.com, available at http://stackoverflow.com/questions/116403/im-looking-for-a-regular-expression-to-remove-a-given-xhtml-tag-from-a-string, retrieved on May 30, 2012, 3 pages, publication date: Sep. 22, 2008.

Howard, et al., "Bug 127137", Bugzilla.Mozilla.org, available at https://bugzilla.mozilla.org/show_bug.cgi?format=multiple &id=127137, retrieved on May 30, 2012, 6 pages, publication date: Feb. 21, 2002.

* cited by examiner

| PARAMETER KEY | CHARACTERISTIC SET ||||||  INSTRUCTION |
| --- | --- | --- | --- | --- | --- | --- | --- |
|  | C1 | C2 | C3 | C4 | C5 | C6 |  |
| $P1_1P2_1P3_1P4_1$ | ✓ | ✓ | ✓ | ✓ | ✓ | ✓ | A, B, C |
| $P1_1P2_1P3_1P4_2$ | ✓ | ✓ |  | ✓ | ✓ | ✓ | A, C, D, E |
| $P1_1P2_1P3_1P4_3$ | ✓ | ✓ |  |  | ✓ | ✓ | A |
| $P1_1P2_1P3_2P4_1$ |  | ✓ | ✓ | ✓ |  | ✓ | D, E, F |
| ⋮ |  |  |  |  |  |  | ⋮ |
| $P1_NP2_NP3_NP4_N$ |  | ✓ |  | ✓ | ✓ | ✓ | X, Y, Z |

*FIG.4*

WEB APPLICATION FRAMEWORK METHOD ENABLING THE CREATION OF APPLICATIONS THAT PROVIDE AN INTERFACE WITH CLIENTS THAT IS INDEPENDENT OF SCRIPTING CAPABILITY

CROSS-REFERENCE TO RELATED APPLICATION

The present application claims priority to U.S. Provisional Application Ser. No. 61/106,594, filed Oct. 19, 2008, the contents of which are hereby incorporated by reference.

BACKGROUND

1. Field

The disclosed concept relates generally to web applications and, more particularly, to a web application framework that enables optimum rendering performance on a client based upon detected parameters of the client.

2. Related Art

It is known that web application developers develop web applications that are executed on servers and that include web content which is made available to clients via a network such as the worldwide web. Such content typically is stored in the form of web pages and other content that are made available to a web application that is deployed to a server. Such web pages often include instructions in the form of markup language such as html which are in the nature of instructions for a client, such as an instruction as to how certain content should be rendered on a display of the client.

It is understood, however, that the various clients, which may take the form of mobile electronic devices and other devices, for instances, have various hardware characteristics, software characteristics, and other characteristic that affect the capabilities of the clients. For example, the various characteristics of a client may include physical properties such as: screen size; screen resolution; screen aspect ratio; color or black-and-white-only, etc. Additionally or alternatively, the various characteristics of a client may include software capabilities, such as: does/doesn't support various fonts; does/doesn't support style sheets; supports only up to HTML 4.0 standard or supports HTML 5.0 (and it's additional features); does/doesn't support JavaScript, etc.

A given piece of markup instruction often is usable for at most a limited number of different clients since certain clients having differing characteristics likely will render in different fashions or in incorrect fashions the subject matter of the markup instructions. Additionally, web pages having JavaScript content will have their JavaScript go unexecuted if the client is incapable of executing JavaScript or has a JavaScript feature disabled.

Various methodologies have been proposed to deal with the large variety of client characteristics. One proposed solution is to provide multiple versions of any given web page, with a different version of the web page being created for each permutation of client characteristics that are deemed to be worthy of supporting. Such an approach requires extensive work by a web application developer because of the large number of times any given web page must be individually replicated in various forms to suit various device characteristics. Another approach has been to write a single version of each web page, with the content being tailored to the client having singularly the lowest level of functionality, whereby all clients, including those having progressively greater degrees of rendering functionality, will be rendered at the same low capability level. While such an approach can save effort, at least initially, on the part of the web application developer, the resulting web application has an undesirably low level of rendering functionality which fails to take advantage of the generally greater rendering capabilities of many of the existing clients. Another proposed approach is to write web applications having pages that are highly sophisticated and which include scripting instructions that are executable on a client, that detect the various characteristics of a client, and that tailor the markup instructions to take advantage of the individual client's rendering and other capabilities. However, such web applications are of an extremely high level of sophistication and are therefore difficult to create, and such web pages often are prohibitively large in size and as a result are very slow to download. Moreover, clients lacking the ability to execute such scripting instructions will be incapable of correctly rendering the content of such a web page. There thus exists a need to provide an improved methodology of enabling web content to be properly rendered on a wide variety of clients.

BRIEF DESCRIPTION OF THE DRAWINGS

A full understanding of the disclosed concept can be obtained from the following Description when read in conjunction with the accompanying drawings in which:

FIG. 4 depicts one exemplary form of a database having permutations of client parameters and corresponding sets of machine-readable storage elements;

Similar numerals refer to similar parts throughout the specification.

DESCRIPTION

Figure 1:
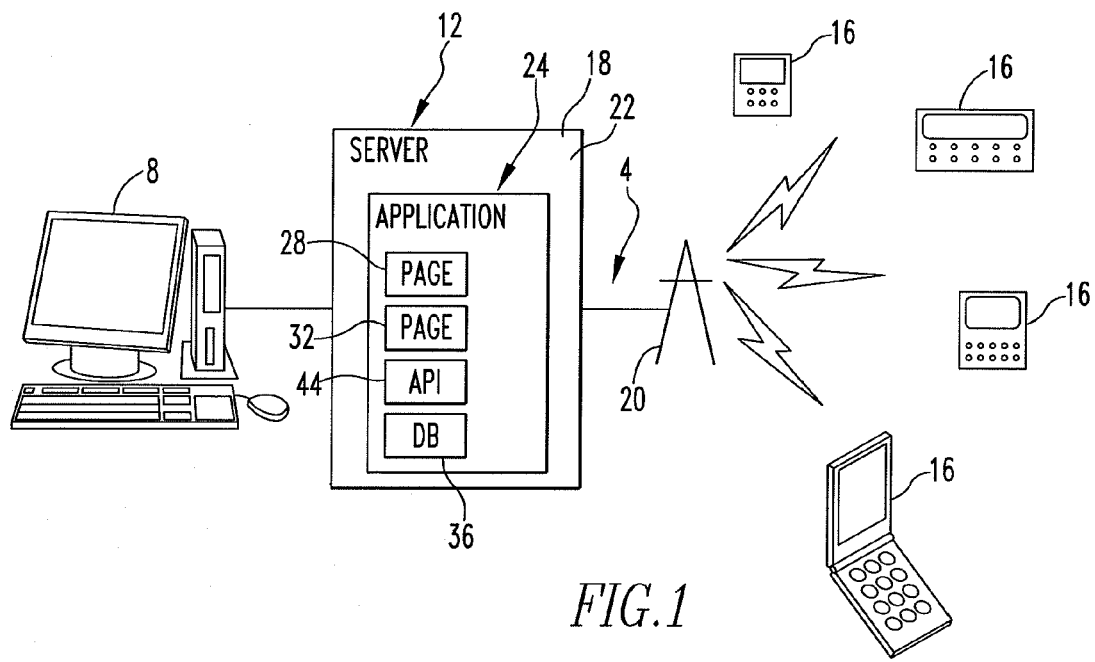
FIG. 1 schematically depicts a data processing arrangement in which the disclosed concept can be created, deployed, or utilized, in any combination.

FIG. 1 depicts in a schematic fashion an exemplary desktop computer 8, an exemplary server 12, and a plurality of clients that are each indicated with the numeral 16 and which are wirelessly connected with a network 4 via an antenna 20. The desktop computer 8, the server 12, and the clients 16 are indicated in FIG. 1 as exemplary components of a data processing system, and it is understood that other components or additional components or both can be employed in accordance with the disclosed concept without departing therefrom.

The clients 16, while being indicated generally with the same numeral 16, are understood to be different from one another or to at least potentially be different from one another. That is, each client 16 has a number of characteristics such as hardware properties and software capabilities, and one or more of the characteristics of any given client 16 may be different from the corresponding one or more characteristics of another client 16, although this need not be the case.

It is advantageously noted that in making an http request, a client 16 typically includes in a header of the request one or more client parameters. A small portion of such a header may look like this fragment:

user-agent:BlackBerry8120/4.3.0Profile/MIDP-2.0 Configuration/CLDC-1.1 VendorID/−1 which includes client parameters indicative of client characteristics such as the client device model number and the browser type and version that is making the request. As employed herein, the expression "parameter" and variations thereof shall refer to arguments that are placed in and that can be parsed from an http request and read by a server receiving the request. While at certain locations herein a client 16 may be characterized as having or possessing client parameters, it is understood that this terminology is understood to be referring to the fact that those parameters are the ones that would be provided in an http request from such a client 16 and that relate to various characteristics of the client 16. As employed herein, the expression "characteristic" and variations thereof shall refer to capabilities of a client 16. In accordance with the disclosed concept, the various client parameters are parsed from the header of the http request, and from these client parameters one or more characteristics of the client can be discerned with the use of a database 36.

Various parameters may be employed in making http requests. For instance, hardware parameters might be said to include, by way of example, the model number of the device of the client, the screen size, the screen pixel density, and the presence or absence of a pointing device, among other hardware parameters. Software parameters might include, for instance, the type of browser that is running on the client device and the version of such browser, among other software parameters. Another parameter might include, for example, whether or not the client has a present capability to execute a scripting language such as JavaScript.

The clients 16 that are expressly depicted in FIG. 1 are representative of a large number of clients 16, each of which will have a particular set of characteristics. While the clients 16 are depicted in FIG. 1 as being wirelessly connected with the network 4, it is understood that other clients 16 may have other types of connections with the network 4 such as wired connections or other wireless connections without departing from the disclosed concept.

The server 12 is depicted in FIG. 1 as comprising a processor 18 and a memory 22 and as having a web application 24 deployed thereon. The memory 22 is an exemplary machine readable storage medium having stored thereon instructions which comprise the application 24 and which, when executed on the processor 18, cause the server 12 to perform certain operations such as one or more of those that are set forth herein. It is understood, however, that the expression "machine readable storage medium" could comprise any type of medium, whether or not presently in existence, that is capable of having instructions stored thereon, and would specifically include, for example, CD and DVD storage media, hard disks, memory chips, and the like without limitation.

Specifically, the instructions executed on the processor 18 generate a runtime, such as a Java runtime or other runtime, within which the application 24 runs. The exemplary server 12 is depicted in FIG. 1 as being an individual component connected with the network 4, but it is understood that the server 12 is more particularly in the nature of the aforementioned runtime within which the application 24 runs. The application 24 can be said to interface with the clients 16 and vice-versa.

The exemplary application 24 is schematically depicted as comprising a plurality of pages indicated at the numerals 28 and 32, a database 36, and a database access engine 44 that are compiled together into an executable form that runs in the runtime afforded by the server 12. As a general matter, the database access engine 44 generally is platform-specific, and it interfaces with the database 36 which generally and advantageously is platform-independent. The database access engine 44 thus can be said to provide an interface between a particular platform and a more generically-conceived database 36. More specifically, the database access engine 44 acts as a mediator between the code for a number of custom tags in a library and the information in the database 36, exposing the database contents to the library in a form that the library code can more easily understand and access.

It is understood that the pages 28 and 32 are exemplary only, and it is also understood that the application 24 may include numerous additional pages that are not expressly depicted herein. The pages 28 and 32 are in the form of files that each comprise a number of components and other data objects that are broadly characterized as being "web content", but the expression is not intended to be limiting in any fashion whatsoever. It is also noted that the elements of the exemplary application 24 depicted in FIG. 1 are not intended to be viewed as being necessary in all formulations of the disclosed concept, and rather are intended to illustrate one example of a system wherein the disclosed concept can be implemented.

The database 36 can be characterized as being a data arrangement and is described in greater detail in conjunction with FIG. 4. It is noted, however, that the database 36 comprises large quantities of machine-readable storage elements that correspond with permutations of client parameters. Any given set of the machine readable storage elements that correspond in the database 36 with a given permutation of client parameters will typically have been selected in view of a number of characteristics of a client 16 having the given permutations of client parameters. Responsive to one or more client parameters being input to the database 36, the database 36 accesses a number of machine-readable storage elements that may be in the nature of data or instructions or both, for instance, which have been selected and stored in the database 36 in view of the set of characteristics that would be found on a client 16 having the one or more client parameters. This therefore enables a number of client parameters that have been provided by a client 16 in making an http request to be input to the database 36, with the database 36 responsively providing some type of output that is tailored to the characteristics of the client 16 since the database 36 already has built in the correlations between a permutation of client parameters and the corresponding set of device characteristics that would be possessed by a client 16 having that permutation of client parameters.

Figure 2:
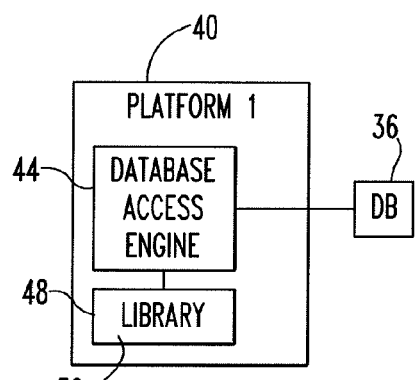
FIG. 2 schematically depicts a first platform for creating web applications.

The database 36 can advantageously be created once and implemented on any of a variety of platforms without requiring the machine-readable storage elements to be rewritten or reconstituted for any specific platform. For example, a platform for use in developing a web application (such as on the desktop computer 8) is specifically depicted in FIG. 2 and is indicated generally with the numeral 40. In the example presented herein, the platform 40 is a Java-based web application framework called JavaServer Faces, and while this particular web application framework will be further described in the example embodiment described herein, it is understood that it is exemplary in nature and is provided for the sake of explanation of the concept rather than being limiting. The example platform 40 comprises the database access engine 44 and a library 48 of components 52 that, in the exemplary depicted embodiment, are in the form of tags. The components 52 may be employed, with or without other content, to create the pages 28 and 32 for deployment to the server 12 as part of the application 24. The database access engine 44 is depicted in FIG. 2 as being structured to interface with the library 48 and the database 36, and in at least some respects the database access engine 44 functions as an application programming interface (API). However, the database 36 is depicted as not necessarily being a part of the platform 40 in order to indicate that the database 36 is not platform-dependent.

Figure 3:
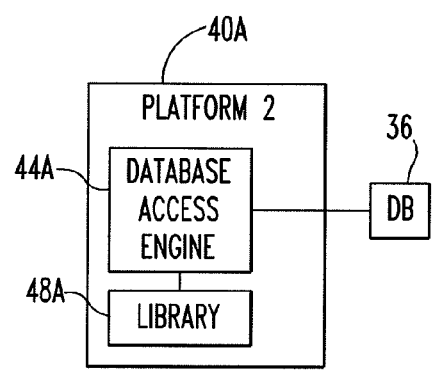
FIG. 3 depicts a second platform for developing web applications.

In order to illustrate the portability of the database 36 from one platform to another, the same database 36 is depicted in FIG. 3 as being employed by another platform 40A. The alternate platform 40A can be used to develop web applications and can be any of a variety of other web application frameworks such as, for instance and without limitation, one entitled "ASP .NET", although this is not intended to be limiting and rather is intended to be merely illustrative of an alternate web application framework. The exemplary platform 40A includes an database access engine 44A and a library 48A of components that can be used in creating pages of web content for deployment on the server 12 or on another server. The database access engine 44A is depicted in FIG. 3 as interfacing directly with the database 36 and the library 48A, and the database 36 is depicted as being in the same condition as when it is depicted in FIG. 2, i.e., as interfacing with the database access engine 44.

As a general matter, the database 36 can be implemented for use in conjunction with virtually any web application framework by creating a library of components that are usable in creating pages of web content, and by further creating a database access engine that comprises class logic and other content and which, when invoked by a component of a web page being requested, is capable of interfacing with the database 36. Such interfacing would include, for instance, taking one or more of the parameters of the client 16 that is requesting the page and determining from the database 36 what markup language or other instruction or both should be created and provided as a data object in place of such web page component. As such, the database 36, which represents a large amount of machine-readable storage elements that correspond with various permutations of client parameters, can be created once and implemented on numerous platforms by creating a custom database access engine and library, thus enabling widespread use of the database 36 without requiring that the database 36 be recreated or reconstituted for the various platforms.

As mentioned above, the database 36 comprises a set of machine-readable storage elements for each of a plurality of permutations of client parameters. The exemplary client parameters employed herein comprise the device model of the client, the version of the firmware on the device, the type of browser executed on the device of the client, and the version of the browser. This listing of client parameters is intended to be exemplary only and is not intended to be exclusive or exhaustive. Such client parameters or other parameters or additional parameters in any combination may be obtained or otherwise ascertained by the application 24 from a header of a request made by a client 16. That is, when a client 16 makes a request that is received by the application 24 on the server 12, the received request comprises a header which includes the client parameters among other information. As such, a header of a request from a client 16 can be said to include information indicative of the particular permutation of the client parameters possessed by the client 16.

Such client parameters in the header are indicative of a number of hardware characteristics or software characteristics or other characteristics in any combination of the client 16 that possesses the particular permutation of client parameters. One or more of the characteristics may results from one or more parameters, and vice-versa, and thus in some circumstances a "parameter" in a header may in some cases be the same as a "characteristic" of a client 16 but in other cases the two may be different. The database 36 thus advantageously comprises permutations of client parameters and, corresponding to each permutation of client parameters, a set of machine-readable storage elements that are selected in accordance with a number of hardware characteristics or software characteristics or other characteristics in any combination of a client 16 possessing the permutation of parameters. The database 36 may be a relational database or may be in other forms without departing from the present concept.

FIG. 4 depicts in an exemplary fashion a portion of the database 36. Specifically, FIG. 4 depicts the contents of the database 36 in a tabular fashion that is provided solely for purposes of illustration. The exemplary database 36 comprises a plurality of parameter keys 54, with each parameter key being representative of a permutation of client parameters. In the example presented herein, each parameter key 54 is formed by appending together the values of each of a number of the client parameters for each of a plurality of permutations of the number of client parameters. The exemplary parameters employed herein are mentioned above.

FIG. 4 also depicts for each parameter key a number of characteristics 56 which are indicated in a checked-box fashion, meaning that for a given parameter key 54, a check mark in the column of any given characteristic 56 indicates that a client 16 having the permutation of client characteristics represented by the given parameter key 54 will possess the given characteristic 56. By way of example, and without limitation, one characteristic 56 might be "display has aspect ratio 1.5:1", and another characteristic 56 might be "display has aspect ratio 1:1", and yet another characteristic 56 might be "display is 256 color capable", and still yet another characteristic 56 might be "display not color capable". It is reiterated that the tabular configuration of FIG. 4 is intended to be illustrative of the various hardware characteristics, software characteristics, or other characteristics in any combination of a client 16 that possesses a particular permutation of client parameters as indicated by a parameter key 54. The exemplary nature of FIG. 4 is further illustrated by schematically depicting for at least some of the parameter keys 54 one or more instructions 60 which may be provided as an alternative or as an addition to the characteristics 56. This is intended to illustrate the fact that different types of machine-readable storage elements, check values as to characteristics 56 and executable instructions in the present example, which may variously be retrieved by the various classes invoked at various time by various components 52 of retrieved web pages.

More particularly, it is noted that the library 48 comprises a number of components 52, and each component 52 may invoke one or more classes of logic whenever a page 28 or 32 that comprises the component 52 is requested by a client 16. As used herein, the expression "class" and variations thereof shall refer broadly to a set of machine-readable instructions that embody a piece of logic, and such logic can comprise a reusable set of associated properties and can further comprise a set of operations that can be performed on or using such properties. The database access engine 44 comprises instructions, and each class can access a certain portion of the instructions of the database access engine 44. Each class of logic of the database access engine 44 may also access a particular portion of the database 36. As such, the database 36 can have numerous portions, such as may be represented as being in the form of various tables, that are variously accessed by the various classes when invoked by the components 52 on the pages 28 and 32. Due to the variability of the logic of each class of the database access engine 44, the various classes may have different requirements with regard to the particular subject matter that is sought to be obtained from the database 36 in order to enable the classes to create markup instructions that are tailored to the characteristics of a client 16 as indicated by the client parameters. That is, upon receipt of a request from a client 16 for a page 28 or 32 of the application 24, the various components 52 of the requested page 28 or 32 each invoke the various classes that correspond with the components 52. In the example of the JavaServer Faces (JSF) platform example described herein, each component has at least three classes, including a component class, a renderer class, and a tag class, although other classes or additional classes or both can be deployed without departing from the present concept.

Each class typically has some dedicated logic which may perform various operations, and the operations of the classes invoked by a given component 52 typically result in the generation of markup instructions, such as html instructions, that are configured to render the component 52 on the client 16 in a fashion that is optimized for the characteristics of the client 16 as were indicated by the client parameters extracted from the header of the request. While in the example presented herein the markup or other instructions are optimized for rendering on the client 16, it is understood that such optimization may be for virtually any other type of operation on the client 16. Each class thus may include its own logic or may include its own individual need for information regarding the characteristics of a client 16 or both, and it may additionally or alternatively require instructions for the particular client 16 that are obtained from the database 36 or may provide specialized post-processing of data or instructions for the entire class or both, by way of example. As such, it can be understood that the database 36 depicted in FIG. 4 is merely representative of the extensive, varied, and detailed contents actually possessed by the database 36.

Figure 5:
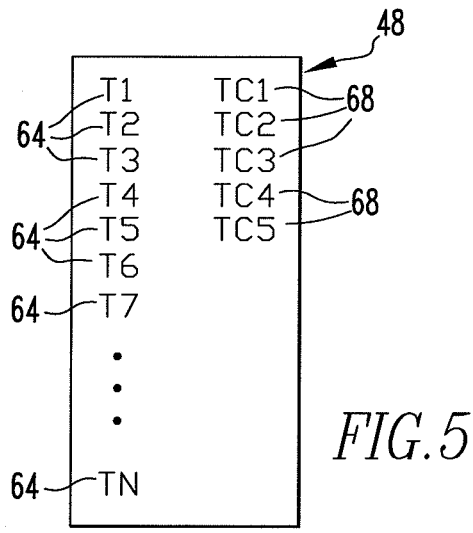
FIG. 5 depicts in a schematic fashion a library of components that can be used in creating web application.

FIG. 5 depicts in an exemplary fashion a portion of the library 48 with its components 52 in the form of tags. The components 52 comprise standard tags 64 and custom tags 68, by way of example. The standard tags 64 may, for instance, be employed on a page 28 or 32 to provide unchanging, i.e., static, markup instructions such as html. On the other hand, the custom tags 68 may be employed to provide dynamically-created markup instructions that may or may not additionally include scripting instructions such as in the form of JavaScript, by way of example. The use of the standard tags 64 in a retrieved page 28 or 32 will result in the invoking of one or more classes that generate static markup instructions. However, the classes that are invoked by custom tags 68 in a retrieved page 28 or 32 will invoke classes that may access the database 36 or perform other operations that result in the generation of markup instructions that are optimized according to the client parameters of the request header. Such optimization may additionally include the creation of scripting instructions such as JavaScript that may be provided in addition to the markup instructions. The disclosed concept thus allows the building of applications such as web pages and other applications by using the components 52 as "building blocks", and each component 52 comes with the type of logic built in that will enable it to render itself in the most appropriate way for each particular client device. The developer of an application such as a web page therefore can simply use the components 52, i.e., the standard tags 64 and the custom tags 68, to compose the web page or other application without being required to give thought to client device variability because the components 52 self-adapt to the capabilities of each client device.

It is noted that JavaScript or other scripting instructions typically will be provided only if the client 16 is determined to have a present capability of executing the scripting instructions. That is, it may be determined that a client 16 does not possess the present capability to execute, for instance, JavaScript, such as by the request header parameters indicating that the client would be incapable of executing JavaScript or indicating that the JavaScript capability of the client 16 is presently disabled. In such a situation, the invoked classes will generate a resultant data object that typically will consist of markup language, for instance, without the addition of scripting instructions. On the other hand, if the client 16 possesses a present capability to executed scripting instructions such as JavaScript, these same invoked classes will generate a resultant data object that typically will include both markup language and scripting instructions. Advantageously, therefore, a data object that includes markup alone will function on a suitable client 16 in a fashion that is functionally identically to or nearly so to the function on a suitable client 16 of a data object that includes markup together with scripting instructions. The developer of the web application is thus advantageously freed from having to consider factors of client device capabilities because the resultant application and generated data objects function identically or nearly so on all device types, regardless of device capabilities It is noted that the markup language created in the JavaScript enabled situation may be the same as or different from that created in the JavaScript non-enabled situation.

An existing web application framework such as the exemplary JSF described herein may already include a library that comprises at least some of the standard tags 64 along with a database access engine comprising corresponding classes and their logic. The creation of the library 48 typically would involve creating the custom tags 68 along with enhancements to the database access engine to form the database access engine 44, or creation of an entirely new database access engine to form the database access engine 44. It is noted that the database 36 provides significant advantages in portability of the data contained therein, but it is understood that the machine-readable storage elements of the database 36 could instead be incorporated into the database access engine if needed.

Figure 6:
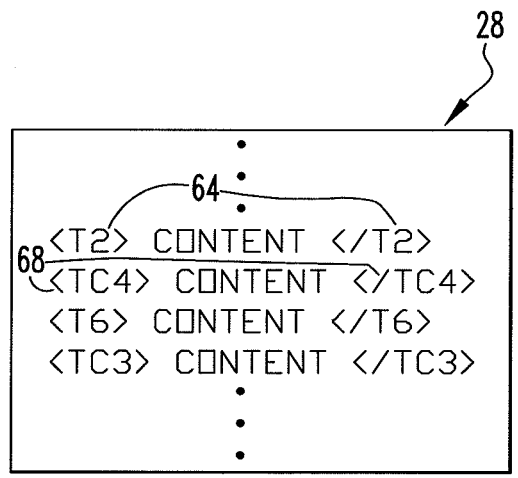
FIG. 6 depicts in a schematic fashion a portion of a page of web content.
Figure 7:
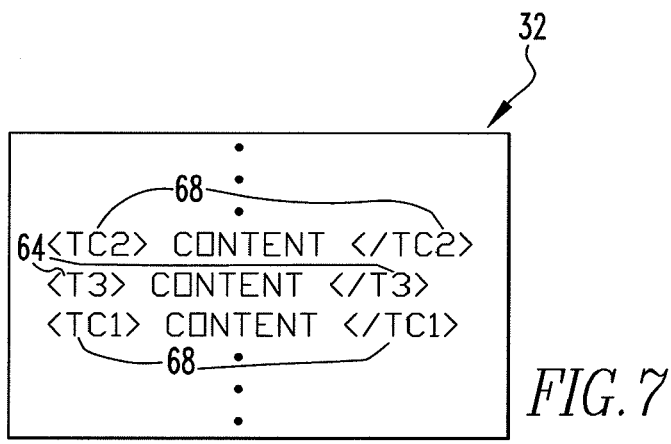
FIG. 7 depicts in a schematic fashion a portion of another page of web content.

As mentioned above, the library 48 lists the standard tags 64 and custom tags 68 that are employable in creating the pages 28 and 32. More specifically, FIG. 6 depicts an exemplary portion of the exemplary page 28, and FIG. 7 depicts an exemplary portion of the exemplary page 32. The schematically depicted lines of instruction in FIGS. 6 and 7 which employ the standard tags 64 could be said to each comprise an html instruction. However, those lines of instruction in FIGS. 6 and 7 that employ the custom tags 68 would be better referred to as an extensible markup language (XML) instruction. When either of the pages 28 and 32 is requested by a client 16, the classes associated with the components 52 of the requested page 28 or 32, i.e., the classes associated with the standard and custom tags 64 and 68 of the requested page 28 or 32, are invoked and, as set forth above, generate a number of data objects that comprise html or other markup instructions, possibly with the addition of scripting instructions such as in JavaScript. The data objects are assembled together and are forwarded as a data set in the form of a page of web content to the requesting client 16. The client 16 then renders the web page on its display in accordance with the received markup instructions with the possible addition of received scripting instructions. Advantageously, therefore, the data set is customized to the capabilities of the requesting client 16, and this facilitates advantages such as, by way of example only, automatic scaling of bitmap images on the server side to fit the available space on small-screened devices, and automatic inclusion of other types of integration between a web page and the built-in features of a particular device (e.g., add an entry to its contact list, show the location of an address in a mapping application, etc.).

The application 24 is also advantageously configured to enable further interfacing with the clients 16 by receiving other requests from the clients 16, i.e., updating requests that involve communication with the server 12, to be handled regardless of whether the client 16 has a present capability to execute instructions in a scripting language, such as JavaScript. By way of example, a data set that is downloaded as a page of web content to a client 16 typically will include one or more data objects, and each data object typically includes instructions in a markup language. If the client 16 has a present capability to execute, for instance, JavaScript, one or more of the data objects may additionally comprise some JavaScript instructions in addition to the markup instructions. On the other hand, if the client 16 lacks a present capability to execute JavaScript, the data set will have been provided with versions of the data objects having markup language alone, i.e., without the addition of JavaScript. This is, as mentioned above, in keeping with the creation of a customized data set in the form of a web page created for a client 16 that makes a request for a page 28 or 32 and that is customized for optimum rendering performance on the client 16 in view of its client parameters.

In the circumstance where a given data object stored on a client 16 includes some JavaScript or other scripting instructions, the data object may make an updating request to the server 12 by transmitting to the server 12 an XMLhttpRequest, which is a request that does not require a reloading of an entire page, but rather is intended to request that the application 24 change a state of a variable or make some other change, for example. Such a request is also referred to as an AJAX request. If available, an AJAX request is desirable because it avoids the need to reload an entire page on the client 16, and it thereby avoids the shortcomings that are typically associated with the reloading of a web page, such as losing partially entered text in text fields of a browser, losing the location and degree of zoom of a portion of a page rendered in a browser, losing locations of vertical or other scroll positions, and the like. It also avoids consuming transmission bandwidth by avoiding a transmission of a page in its entirety.

In the situation where a request is in the form of an XMLhttpRequest, the URL of such an XMLhttpRequest typically will include the identity of a custom servlet of the application 24, and the request is thus automatically transferred directly to the identified custom servlet. The custom servlet will then perform the same set of class logic as when the requesting component was originally generated by the database access engine 44, except that it will additionally, for instance, change the state of a variable that is represented by the requesting component of the data set on the client 16. If the requested change of state is successful, the custom servlet will generate and transmit to the client 16 response that is representative of "success". Otherwise, it may send a response that is representative of "failure" or another appropriate communication indicative of the result. In the situation where the returned response is representative of "success", the JavaScript or other scripting instructions of the requesting data object may cause the rendered element to be re-rendered on the client 16 in such a fashion to represent the changed state of the aforementioned variable. By way of example, the response may be a value such as an integer value, such as an integer value of one for "success" and an integer value of zero for "failure", although the response could be any type of communication without limitation.

On the other hand, if a data object of a web page stored on a client 16 needs updating but lacks scripting instructions, the data object will typically be unable to make an XMLhttpRequest and rather will make an http POST request, which is a request for the reloading of an entire page. In such a situation, the receipt of an http POST request, i.e., a page request, results in initiation of an application environment servlet in a runtime, such as in the exemplary JSF environment wherein a FacesServlet is initiated in a Java runtime on the server 12. Based upon the request header, the exemplary FacesServlet invokes the classes of the data object that made the request, and such classes include logic to cause, for example, a change in state of a variable that is represented by the requesting data object. Additionally, an alternate version of the requesting data object is generated for inclusion in the updated page. The exemplary FacesServlet also retrieves the stored states of the other components of the page and recreates with these stored states the data objects that had previously been created for such components. All of the data objects are assembled into the updated page, which is then transferred to the client 16 and is rendered thereon. As is generally understood, JSF provides the feature of saving states of web page components, thereby avoiding the necessity of reprocessing of the associated class logic if a given component did not make an http POST request of the application 24.

The aforementioned XMLhttpRequest and http POST Request are intended to illustrate a request initiated by two different versions of the same data object on two different clients 16, i.e., one data object on one client 16 possessing a present capability to execute scripting instructions such as JavaScript, the other data object on the other client 16 lacking a present capability to execute scripting instructions such as JavaScript. For the client 16 having the JavaScript capable version of the data object, the XMLhttpRequest requires far less communications bandwidth and far less processing since it requires the transmission to the client of less than an entire page and additionally is processed by a custom servlet that generally at most, for example, changes a state of a variable and communicates a confirmation or other indication of the success or failure of such a processing effort. For the version of the data object that is not JavaScript enabled, the requesting data object must request that the entire page be reloaded via the html POST Request. The receipt of the html POST request on the server 12 initiates the exemplary FacesServlet which executes the class logic of the requesting data object and retrieves stored states of other data objects to generate an updated page for transmission to the client. The class logic invoked with the FacesServlet also possesses logic to cause, for example, the change of state of the same variable, albeit through slightly different operations.

In either situation, however, the rendered result of the update on any particular client 16 is substantially the same regardless of whether the client 16 is JavaScript enabled or not (neglecting for the moment differences among other characteristics of, for instance, the displays of the clients 12). That is, the application 24 is advantageously configured to download to a given client 16 whichever version of the data object, i.e., the JavaScript enabled version or the JavaScript non-enabled version, is best suited to the client 16 based upon the client parameters of the header of the original page request. The data object downloaded to and stored on the client 16 then makes either an XMLhttpRequest or an html POST Request depending upon whether the data object is the JavaScript enabled version or the JavaScript non-enabled version, respectively. For the JavaScript enabled version of the data object, the application 24 changes a state of a variable represented by the data object, for example, and sends to the client 16 a confirmation of the change in state, thereby causing the data object to re-render itself to indicate the change in state of the variable. On the other hand, if the JavaScript non-enabled version of the data object makes its http POST Request, the JSF lifecycle is initiated and executed on the server 12 and creates an updated version of the page which is downloaded to the client 16 and rendered thereon. The client logic invoked by the JSF lifecycle changes the state of the same variable, for instance, and generates a replacement data object reflective of the change in state for inclusion in the updated version of the page.

As such, the application 24 enables an initial request for a page from a client 16 to result in the rendering of web content on the client 16 in a substantially consistent fashion regardless of whether the requesting client 16 is JavaScript enabled or is JavaScript non-enabled, and the application 24 achieves the same kind of consistent rendered result in the situation of an updating request from either type of client. It is expressly noted, however, that such similarity may be unavailable in cases where a client 16 is limited in its rendering capabilities, such as if it is capable of providing text in a single font and color rather than in multiple fonts and colors, by way of example.

Figure 8:
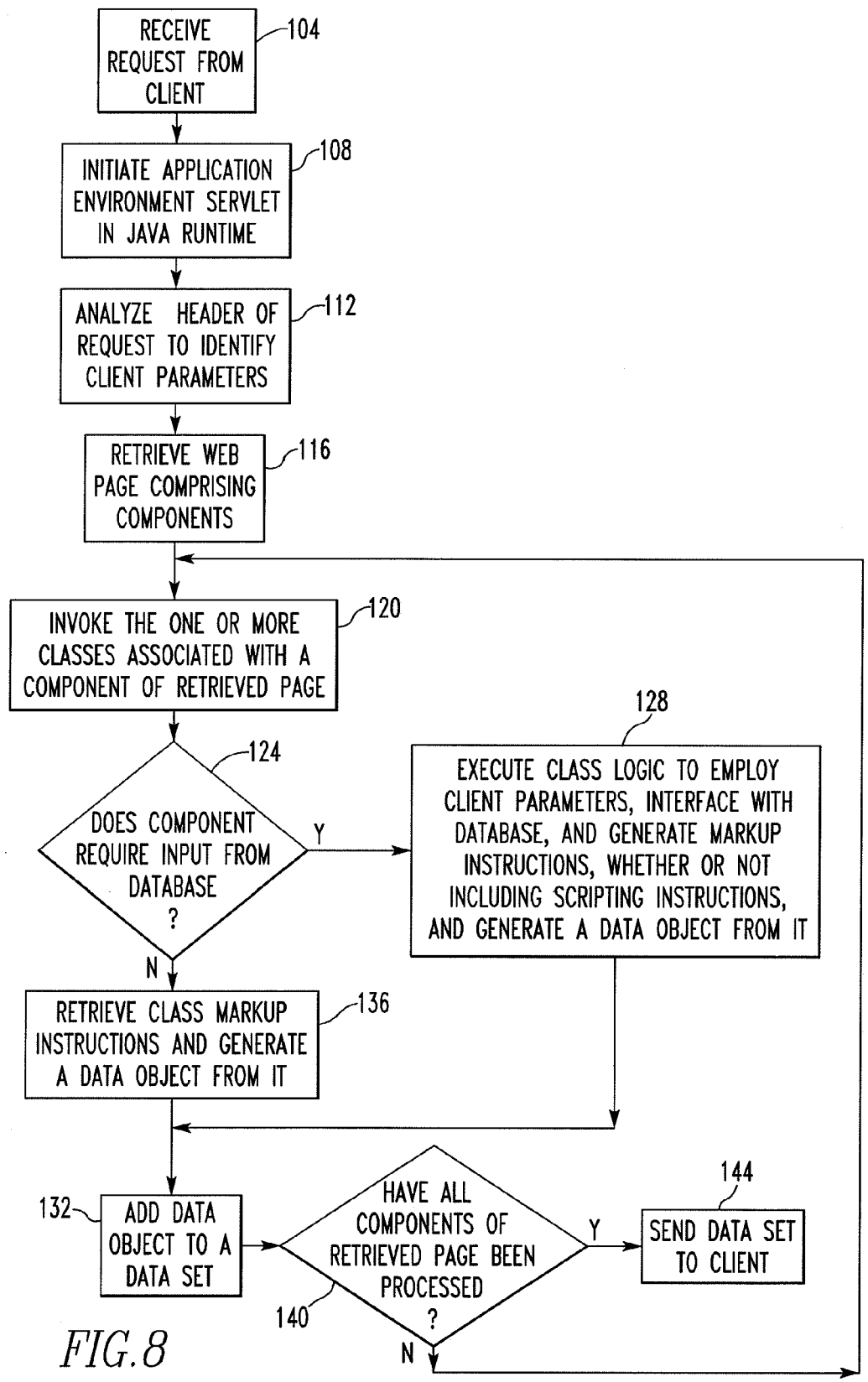
FIG. 8 is a flowchart depicting certain aspects of a method in accordance with the disclosed concept.

FIG. 8 generally depicts certain aspects of the method of the disclosed concept. The server 12 receives from a client 16 an initial request for a page, as at 104. In response thereto, the application 24 initiates an application environment servlet in a runtime afforded by the server 12, as at 108. In the example presented herein, the environment servlet is a FacesServlet executed in a Java runtime, although the servlet may be on a different platform without departing from the present concept.

Thereafter, the application analyzes the header of the request to identify one or more client parameters, as at 112. The identity of the requested web page typically will be included in the URL of the request, and this information is employed to retrieve, as at 116, the requested web page, which is typically in the form of a data file and comprises a number of components. Thereafter, the one or more classes that are associated with each component of the retrieved page are invoked, as at 120. If the logic of an invoked class determines, as at 124, that input is required from the database 36, processing is transferred to 128 where the class logic associated by the component employs one or more of the client parameter in interfacing with the database 36 to generate a set of markup instructions. In so doing, the class logic may employ the one or more client parameters to retrieve one or more corresponding machine-readable storage elements from the database 36. The class logic may additionally generate some scripting instructions, such as JavaScript, if it is determined that the requesting client 16 is capable of executing such scripting language. The class logic, which is embodied in the database access engine 44, will then generate a data object that comprises the markup instructions and, as appropriate, any scripting instructions. The data object is added to a data set, as at 132.

On the other hand, if it is determined, as at 124, that the component being processed does not require input from the database 36, such as if it is determined that the component employs a standard tag 64, processing continues at 136 where the class logic generates static markup instructions, whether or not additionally including scripting instructions, and a data object is generated therefrom. Such data object is similarly added to the data set, as at 132.

It is then determined, as at 140, whether all components of the retrieved page have been processed. If not, processing continues, as at 120, wherein another component is processed by invoking its associated classes. Otherwise, such as if it is determined at 140 that all of the components of the retrieved page have been processed, the assembled data set is sent to the client, as at 144, for rendering on the client. It is noted that additional processing such as post-processing may be performed during the operations depicted generally in FIG. 8.

Figure 9:
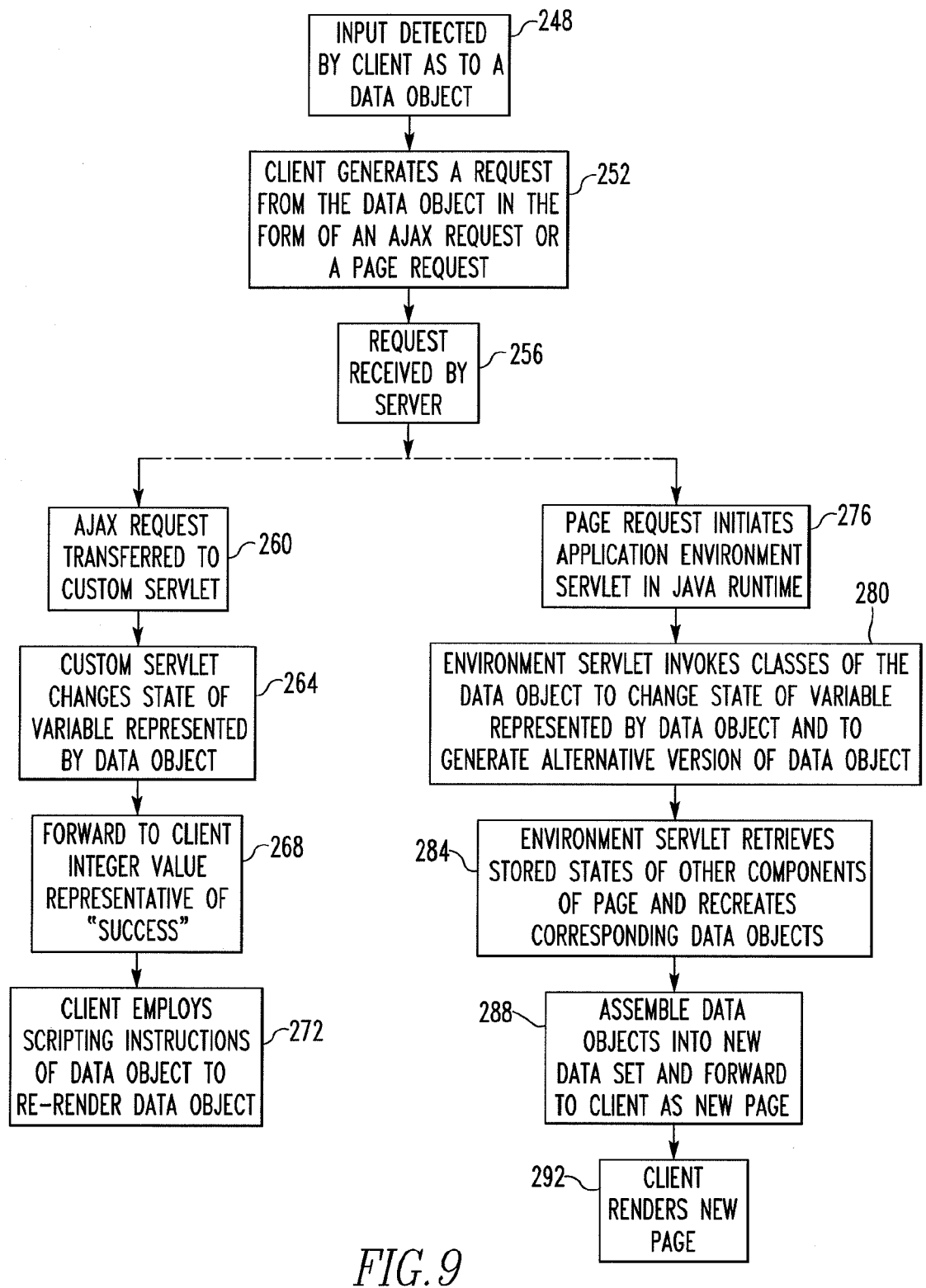
FIG. 9 is another flowchart depicting other aspects of a method in accordance with the disclosed concept.

Other aspects of the disclosed concept are indicated in flowchart depicted generally in FIG. 9. An input is detected by a client 16, as at 248, with respect to a data object of a data set that is in the form of a web page stored on and rendered on the client 16. Such an input typically will be an action performed by a user of the client 16, such as a double clicking on a page component, a movement of a mouse cursor onto a page component, or a typing of some text into a page component, although these are intended to be non-limiting examples. The client 16 thereafter generates, as at 252, a request from the requesting data object in the form of an AJAX Request, i.e., an XMLhttpRequest, or a page request, i.e., and html POST Request. The request is then received, as at 256, by the server 12. The application 24 on the server 12 then takes one of two courses of action depending upon whether the request was an AJAX request or a page request.

An AJAX request is transferred, as at 260, to a custom servlet such as would be designated in the URL of the AJAX request. The custom servlet would then change, for example, and as at 264, a state of a variable that is represented by the requesting data object. The application 24 would then forward to the client 16 a response that is representative of "success", as at 268. For the sake of completeness, it is noted that if the custom servlet is unsuccessful in changing the state of the variable, a different type of response will be returned to the client 16. The client 16 then employs, as at 272, scripting instructions such as JavaScript already existent in the data object on the client 16 to re-render the requesting data object, for example, or take other action.

On the other hand, a page request initiates, as at 276, the application environment servlet which, in the present example, is a FacesServlet running in a Java runtime. As at 280, the exemplary FacesServlet then would retrieve the web page that comprises the requesting data object, would invoke the classes of the requesting data object to change a state of the variable represented by the data object, for example, and would generate an alternate version of the data object for inclusion in a new version of the requested page. Processing thereafter continues, as at 284, where the exemplary FacesServlet retrieves the stored states of any non-requesting components of the requested page and recreates the data objects that had previously been transmitted as part of the original data set to the client 16. All of the data objects are assembled into a new version of the data set, as at 288, that is forwarded to the client 16 in the form of a new page. The client then renders, as at 292, the new page.

The concept presented herein thus advantageously provides a database 36 that can be employed on numerous platforms without recreating the contents of the database 36. The database 36 can be extensive and can be interfaced by class logic having a rich content. The library 48 of standard tags 64 and custom tags and 68 can be advantageously employed to create a single version of each page 28 or 32 having by way of its custom tags 68 an ability to dynamically generate markup instructions, whether or not additionally including JavaScript or other scripting instructions, that are configured for optimum processing on the requesting client 16 based upon the detected parameters of the client 16. The concept also advantageously enables an updating operation to occur which provides substantially the same rendered result on a client 16 regardless of whether the client 16 is Java enabled or is Java non-enabled, it being reiterated that the rendering capabilities of any given client 16 may be otherwise limited in terms of color, font size, font content, and the like.

While specific embodiments of the disclosed concept have been described in detail, it will be appreciated by those skilled in the art that various modifications and alternatives to those details can be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of interfacing a server with a client from among a plurality of clients, the method comprising:
   receiving on the server a request from a user interactive component of a data set stored on the client;
   if the request is from a version of the user interactive component having a markup instruction set, then sending to the client as a response to the request an updated version of the data set;
   if the request is from a version of the user interactive component having the markup instruction set plus a script instruction set, then sending to the client as the response to the request a communication that is less than the entirety of the data set;
   responsive to the request, changing a state of a variable from one state to another state;
   when the request is from the version of the user interactive component having the markup instruction set, providing as part of the updated version of the data set an alternate version of the user interactive component reflective of the another state of the variable; and
   when the request is from the version of the user interactive component having the markup instruction set plus the script instruction set, providing as the response a confirmation of the another state of the variable.

2. The method of claim 1, further comprising receiving:
   an http POST request when the request is from the version of the user interactive component having the markup instruction set, and
   an XMLhttpRequest when the request is from the version of the user interactive component having the markup instruction set plus the script instruction set.

3. The method of claim 1 wherein the request from the version of the user interactive component having the markup instruction set plus the script instruction set is a request to change a state variable from one state to another, and wherein said communication that is less than the entirety of the data set is a confirmation that the request to change the state variable is successful.

4. The method of claim 1 wherein the request from the version of the user interactive component having the markup instruction set is an http POST request and the request from the version of the user interactive component having the markup instruction set plus the script instruction set is an XMLhttpRequest.

5. The method of claim 1 wherein the data set is web content and the version of the user interactive component having the markup instruction set does not have a script instruction set.

6. The method of claim 3 wherein the request from the version of the user interactive component having the markup instruction set is an http POST request and the request from the version of the user interactive component having the markup instruction set plus the script instruction set is an XMLhttpRequest.

7. A server structured to interface with a client from among a plurality of clients, the server comprising:
   a processor; and
   a memory having stored therein instructions which, when executed on the processor, cause the server to perform operations comprising:
   receiving a request from a user interactive component of a data set stored on the client;
   if the request is from a version of the user interactive component having a markup instruction set, then sending to the client as a response to the request an updated version of the data set;
   if the request is from a version of the user interactive component having the markup instruction set plus a script instruction set, then sending to the client as the response to the request a communication that is less than the entirety of the data set;
   responsive to the request, changing a state of a variable from one state to another state;
   when the request is from the version of the user interactive component having the markup instruction set, providing as part of the updated version of the data set an alternate version of the user interactive component reflective of the another state of the variable; and
   when the request is from the version of the user interactive component having the markup instruction set plus the script instruction set, providing as the response a confirmation of the another state of the variable.

8. The server of claim 7 wherein the operations further comprise receiving:
   an http POST request when the request is from the version of the user interactive component having the markup instruction set, and
   an XMLhttpRequest when the request is from the version of the user interactive component having the markup instruction set plus the script instruction set.

9. The server of claim 7 wherein the request from the version of the user interactive component having the markup instruction set plus the script instruction set is a request to change a state variable from one state to another, and wherein said communication that is less than the entirety of the data set is a confirmation that the request to change the state variable is successful.

10. The server of claim 7 wherein the data set is web content and the version of the user interactive component having the markup instruction set does not have a script instruction set.

11. The server of claim 9 wherein the request from the version of the user interactive component having the markup instruction set is an http POST request and the request from the version of the user interactive component having the markup instruction set plus the script instruction set is an XMLhttpRequest.

12. A non-transitory machine-readable storage medium having stored thereon instructions which, when executed on a processor of a server that is structured to interface with a client from among a plurality of clients, cause the server to perform operations comprising:

receiving a request from a user interactive component of a data set stored on the client;

if the request is from a version of the user interactive component having a markup instruction set, then sending to the client as a response to the request an updated version of the data set;

if the request is from a version of the user interactive component having the markup instruction set plus a script instruction set, then sending to the client as the response to the request a communication that is less than the entirety of the data set;

responsive to the request, changing a state of a variable from one state to another state;

when the request is from the version of the user interactive component having the markup instruction set, providing as part of the updated version of the data set an alternate version of the user interactive component reflective of the another state of the variable; and when the request is from the version of the user interactive component having the markup instruction set plus the script instruction set, providing as the response a confirmation of the another state of the variable.

13. The non-transitory machine-readable storage medium of claim 12 wherein the operations further comprise receiving:

an http POST request when the request is from the version of the user interactive component having the markup instruction set, and an XMLhttpRequest when the request is from the version of the user interactive component having the markup instruction set plus the script instruction set.

14. The non-transitory machine-readable storage medium of claim 12 wherein the non-transitory machine-readable storage medium is selected from the group consisting of: memory, a CD storage medium, a DVD storage medium, a hard disk, and a memory chip.

15. The non-transitory machine-readable storage medium of claim 12 wherein the request from the version of the user interactive component having the markup instruction set plus the script instruction set is a request to change a state variable from one state to another, and wherein said communication that is less than the entirety of the data set is a confirmation that the request to change the state variable is successful.

16. The non-transitory machine-readable storage medium of claim 12 wherein the data set is web content and the version of the user interactive component having the markup instruction set does not have a script instruction set.

17. The non-transitory machine-readable storage medium of claim 15 wherein the request from the version of the user interactive component having the markup instruction set is an http POST request and the request from the version of the user interactive component having the markup instruction set plus the script instruction set is an XMLhttpRequest.

* * * * *